United States Patent Office 2,934,424
Patented Apr. 26, 1960

2,934,424

DECONTAMINATION OF PLUTONIUM-ALUMINUM ALLOY MATERIAL

Donald E. McKenzie, Deep River, Ontario, Canada, assignor to Atomic Energy of Canada Limited, Ottawa, Ontario, Canada, a corporation of Canada No Drawing. Application May 2, 1956
Serial No. 582,079

4 Claims. (Cl. 75—84.1)

This invention relates to the decontamination of plutonium-aluminum alloy material which has been irradiated with neutrons in a nuclear reactor.

In carrying out the invention the plutonium-aluminum material is dissolved in a molten bath consisting essentially of a fluoride of an alkali or alkali earth metal and a fluoride of lead, cadmium or zinc. Sodium fluoride and lead fluoride are preferred. The alloy material dissolves as indicated by the reaction.

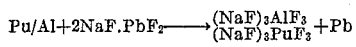

That is to say, the plutonium and aluminum reduce the lead fluoride and form the corresponding fluorides and lead metal. The latter contains fission products such as ruthenium, molybdenum and niobium which will not reduce lead fluoride.

The lead phase is mechanically separated from the salt phase and the molten salt phase is contacted with aluminum metal to effect the reaction.

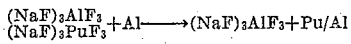

That is to say, the aluminum metal reduces the plutonium complex salt to the aluminum fluoride complex salt and plutonium-aluminum alloy which is recovered for reuse in a nuclear reactor.

As indicated above sodium fluoride is preferred since $(NaF)_3AlF_3$ is a naturally occurring mineral and convenient for waste disposal. Lead has a lower neutron capture cross-section and is thus preferable to cadmium or zinc.

The salt bath has a melting temperature of about 850° C. and the plutonium-aluminum alloy material is dissolved in it at a temperature of about 950° C. to quickly dissolve the alloy material which is preferably introduced in small pieces to avoid spattering.

Similarly the aluminum metal is added to the salt phase in the second step of the operation in small amounts and, although aluminum is required only to reduce the salt, an excess is preferably used to insure liquidity of the alloy. The amount of aluminum added is such that the resulting alloy contains 10 to 20% plutonium. In the final stage of this step the melt is held at the melting point of the fluoride salt phase. A temperature of 1050° C. is effective.

The following examples illustrate the invention.

(1) 0.462 gram of neutron irradiated plutonium-aluminum alloy containing 58.7 mg. of plutonium was dissolved in 1.73 grams of sodium fluoride and 5.21 grams of lead fluoride at 900° C. under 1 atmosphere of argon. The lead was separated from the salt phase and the latter was treated with 0.368 gram of aluminum at 1050° C. for one half hour. The alloy metal phase was separated from the salt phase. The alloy metal phase contained 56.4 mg. or 96% of the original plutonium.

(2) 0.356 gram of neutron-irradiated plutonium-aluminum alloy, 0.915 gram of unirradiated alloy, containing a total of 0.158 gram of plutonium, and 0.303 gram of aluminum were dissolved in 7.29 grams of sodium fluoride and 21.5 grams of lead fluoride at a temperature of 900° C. under 1 atmosphere of argon. The lead was separated from the salt phase mechanically and the latter was heated with 1.502 grams of aluminum at 1050° C. for one hour. The salt phase was successively treated in this manner three times, separating the aluminum and salt after each treatment, and the distribution of plutonium and $\beta\gamma$ activity expressed as a percentage of the original was as follows:

|  | Pu | $\beta\gamma$ activity |
|---|---|---|
| Pb Phase | 0.2 | 11.7 |
| Crucibles | 2.2 | 15.3 |
| Salt Phase | 0.7 | 30.3 |
| 1st Al Product | 86.2 | 23.2 |
| Total Al Product | 92.5 | 34.1 |

What is claimed is:

1. A method of decontaminating neutron irradiated plutonium-aluminum alloy material which comprises adding the material to sodium fluoride and lead fluoride in proportions to convert the plutonium and aluminum to the respective fluoride salts and free the lead, heating the mixture at a temperature above 850° C. to dissolve the material to effect the reaction, separating the lead from the salt phase, adding to the salt phase aluminum in proportions sufficient to reduce the salt phase to sodium aluminum fluoride and form plutonium-aluminum alloy, heating the mixture to at least the melting point of the salt phase to effect the reaction and removing the decontaminated alloy from the salt phase.

2. The method defined in claim 1 wherein the salt phase and plutonium-aluminum alloy is heated at 1050° C.

3. The method defined in claim 1 wherein the salt phase is treated a plurality of times with aluminum.

4. The method defined in claim 1 wherein an excess of aluminum is added to the salt phase.

References Cited in the file of this patent

Buyers et al.: U.S.A.E.C. Document NAA-SR-926, dated June 1, 1954; declassified Dec. 12, 1955 (26 pages).

Buyers: U.S.A.E.C. Document NAS-SR-1157, dated March 15, 1955; declassified Dec. 14, 1955 (32 pages).